UNITED STATES PATENT OFFICE.

CONRAD SCHRAUBE AND ERNST LAUDIEN, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

CELLULOID-LIKE SUBSTANCE.

No. 892,899.           Specification of Letters Patent.           Patented July 7, 1908.

Application filed June 12, 1906. Serial No. 321,346.

*To all whom it may concern:*

Be it known that we, CONRAD SCHRAUBE and ERNST LAUDIEN, doctors of philosophy and chemists, subjects of the King of Prussia, residing at Ludwigshafen-on-the-Rhine, in the Kingdom of Bavaria, German Empire, have invented new and useful Improvements in Celluloid-Like Substances, of which the following is a specification.

Our invention relates to new compositions of matter resembling celluloid.

We have discovered that the amidins which can be derived from ortho-diamido compounds of the aromatic series will make nitrocellulose swell and can therefore be substituted for camphor in the manufacture of substances resembling celluloid from nitrocellulose. We have found that in particular the amidins which can be derived from as-trichlordiamidobenzene and from v-tetrachlordiamidobenzene, the abbreviations as and v are used to denote the words asymmetrical and vicinal in the manner well known to and used by chemists, that is to say, amidins possessing the constitution represented by the following formula

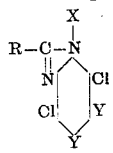

(where R indicates hydrogen, or alphyl, or aryl, X indicates hydrogen, or alphyl, and where one Y indicates chlorin while the other Y indicates hydrogen, or chlorin), are particularly suited for use according to this invention. These latter compounds are new and can be prepared as described in our application for Letters Patent Serial No. 321,347.

The following examples will serve to further illustrate the nature of our invention and how it can be carried into practical effect, but our invention is not confined to these examples. The parts are by weight.

Example 1. Mix together thirty (30) parts of orthotoluylenemethenylamidin

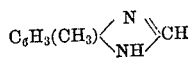

and seventy (70) parts of nitrocellulose and with the addition of alcohol work up after the usual manner of making substances resembling celluloid.

Example 2. Mix together thirty-five (35) parts of ethylethenyltrichloramidin and sixty-five (65) parts of nitrocellulose and with the addition of alcohol work up after the usual manner of making substances resembling celluloid.

Example 3. Mix together thirty (30) parts of methylethenyltrichloramidin of the formula

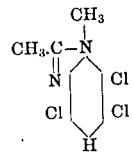

and seventy (70) parts of nitrocellulose and with the addition of alcohol work up after the usual manner of making substances resembling celluloid.

Now what we claim is:

1. As new compositions of matter celluloid-like substances containing nitrocellulose and an amidin which can be prepared from an aromatic ortho-diamido compound.

2. As new compositions of matter celluloid-like substances containing nitrocellulose and an amidin which possesses a constitution corresponding to the hereinbefore defined formula

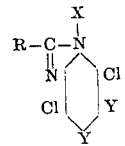

3. As a new composition of matter a celluloid-like substance containing nitrocellulose and ethylethenyltrichloramidin.

In testimony whereof we have hereunto set our hands in the presence of two subscribing witnesses.

CONRAD SCHRAUBE.
ERNST LAUDIEN.

Witnesses:
ERNEST F. EHRHARDT,
H. W. HARRIS.